United States Patent Office 3,162,893
Patented Dec. 29, 1964

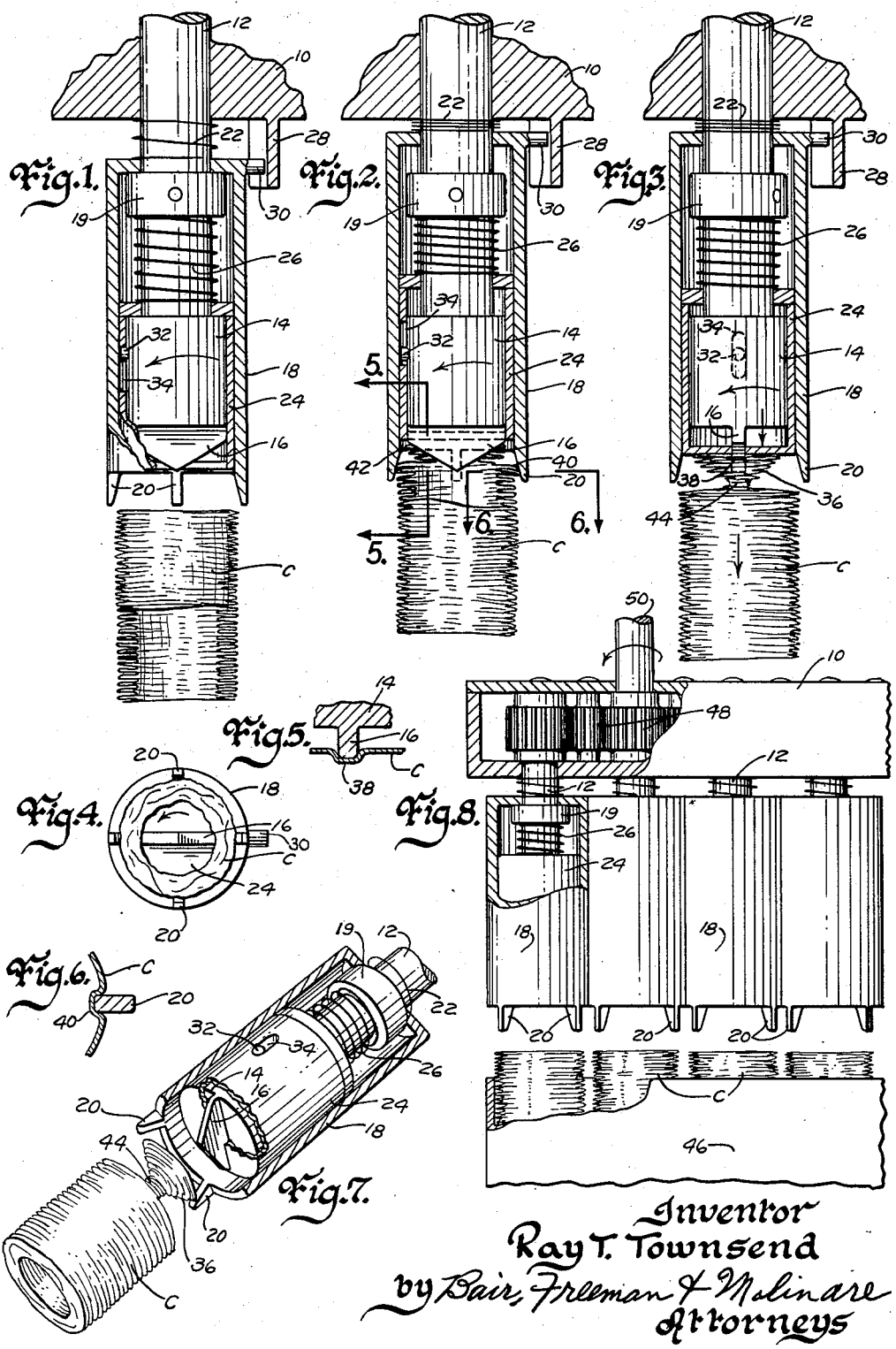

3,162,893
CASING END CLOSER
Ray T. Townsend, Des Moines, Iowa, assignor to Townsend Engineering Company, Des Moines, Iowa, a corporation of Iowa
Filed July 12, 1963, Ser. No. 294,620
9 Claims. (Cl. 17—34)

This invention relates to a closing device for the end of a sausage casing or the like operable to close the end of such casing before the same is stuffed with ground meat or other mixtures.

The end of a sausage casing can be tied closed or the marginal end can be twisted relative to the remaining portion of the casing and thereby closed. I have found that tied casings are not filled as satisfactorily as desired in a sausage stuffing machine but on the other hand, when the end of the casing is twisted closed, the operation is satisfactory because there is a certain degree of resiliency in the twisted end which absorbs the initial impact of the ground meat forced into the casing by the machine and thereby prevents bursting of the casing.

It is therefore an important object of my present invention to provide a readily operable and efficient means for closing the ends of sausage casings.

Another object is to provide such a means in the form of a rotating twisting member having means on one end thereof to engage the end of a sausage casing and twist the marginal end thereof relative to the remaining portion of the casing when such remaining portion is held against rotation.

Still another object is to provide non-rotating means for holding such remaining portion of the casing against rotation while the rotating twisting member is twisting the marginal end of the casing.

A further object is to provide a means to aid in stripping the casing from the rotating twisting member after the end of the casing has been twisted closed.

Still a further object is to provide an apparatus in the form of a rotating shaft having a fluted twisting head thereon, a stripper sleeve surrounding the twisting head and a holding sleeve surrounding the twisting sleeve, the two sleeves being spring biased to resiliently resist movement of the casing toward the twisting head and thereby effect a guiding and holding of the casing as it is associated with the twisting head and a stripping operation thereof with respect to the twisting head withdrawal of the casing with respect to the twisting head.

With these and other objects in view, my invention consists in the construction, arrangement and combination of the various parts of my casing end closer and in my method, whereby the objects above contemplated are attained, as hereinafter more fully set forth, pointed out in my claims and illustrated in detail on the accompanying drawing, wherein:

FIG. 1 is a sectional view through a casing end closer embodying my invention and showing a casing ready to be associated therewith;

FIG. 2 is a similar sectional view showing the position of the parts during the casing twisting operation;

FIG. 3 is a similar sectional view showing the position of the parts during a stripping operation.

FIG. 4 is a bottom view of FIG. 1;

FIGS. 5 and 6 are enlarged sectional views on the lines 5—5 and 6—6, respectively, of FIG. 2;

FIG. 7 is a perspective view of my casing end closer partially in section and a casing there adjacent having the end thereof twisted closed, and FIG. 8 is a side elevation partially in section showing how a multiplicity of my casing end closers may be associated with casings in a carton for simultaneously twisting all of the casing ends.

On the accompanying drawing I have used the reference numeral 10 to indicate a stationary supporting housing. A shaft 12 is journaled therein as shown in FIG. 1 and has thereon a twisting head 14 which forms a rotating twisting member. This member 14 is provided with means to engage the end of a casing C and rotate the marginal end thereof comprising one or more radial flutes 16. I have shown such a flute extending across the lower end of the head 14.

Surrounding the head 14 is a casing holder 18 in the form of a sleeve having holding prongs 20 on its lower end. The inner edges of these prongs are at an angle so that they converge upwardly and thereby guide the casing C toward the twisting head 14 as shown in FIG. 2 when the casing is moved upwardly from the position of FIG. 1 to the position of FIG. 2. A casing holder spring 22 is arranged to resist upward movement of the sleeve 18 away from a collar 19 on the shaft 12.

Interposed between the head 14 and the holding sleeve 18 is a stripper sleeve 24 which is likewise arranged to resiliently resist upward movement by means of a stripper spring 26.

Means is provided for preventing rotation of the sleeve 18 in the form of a channel-shaped guide 28 from the housing 10 and a projection 30 from the sleeve 18 guided therein. Means is provided to cause rotation of the sleeve 24 with the head 14 in the form of a pin 32 projecting from the head and entering a slot 34 in the sleeve.

Practical Operation

In the operation of my casing end closer (assuming the parts initially in the position of FIG. 1), it is obvious that the casing C may be moved upwardly so that its upper end is positioned among the prongs 20 as shown, for instance, in FIG. 2. First the end will engage these prongs and be depressed by them as at 40 in FIG. 6 and thus held against rotation. The casing is moved further upwardly which causes the holding sleeve 18 to move upwardly against the action of the spring 22 and the marginal end of the casing shown at 42 will engage the flute 16, being depressed thereby at 38 as shown in FIG. 5 while the remaining portion of the casing at its upper end will then be depressed as at 40 by the prongs 20. Since the flute 16 is rotating relative to the prongs, the marginal portion 42 will be rotated relative to such remaining portion of the casing to form the closed end 36 shown in FIGS. 3 and 7 having a knot-like neck 44 where the casing is twisted tightly upon itself and thereby closed against discharge of sausage therefrom when the casing C is subsequently filled. During this end closing operation the stripper sleeve 24 is pushed upwardly against the bias of its spring 26 as shown in FIG. 2.

As the casing C is withdrawn from the casing end closer the spring 26 will expand causing the stripper sleeve 24 to push the closed end 36 of the casing away from the twisting head 14 and its flute 16 as shown in FIG. 3 before the casing is withdrawn from the holding prongs 20. Thus the twisted end 36 will remain twisted without being disturbed. In have found that casings having ends closed in this manner are not subject to bursting when filled by my stuffing machine hereinbefore referred to as compared to ends which are tied closed.

For greatest efficiency the combination of twisting head 14, holding sleeve 18 and stripper sleeve 24 is desirable. However, the twisting head 14 alone can accomplish end closing of the casing C if the casing is held by hand against the head 14, and after the end is closed the casing can be withdrawn even though no stripper sleeve 24 is provided. However, the holding prongs 20 help to guide the casing C properly to a position of coaction with the twisting head and the stripper sleeve 24 more effectively disengages the closed end of the casing from the twisting head and are therefore desirable as additions to the twisting head.

This is particularly true when a plurality of the casing end closers are ganged as shown in FIG. 8 for twisting a full carton of casings in one operation. For instance, there may be five rows of ten each for simultaneously twisting the ends of fifty casings in a carton 46. The shafts 12 of the twisting heads may be geared together as indicated at 48 and one of the shafts 50 may serve as a drive shaft, being driven by an electric motor or the like through suitable step-down gearing. The entire assembly of housing 10 and casing end closers supported thereby may be brought over the carton 46 and moved downwardly and then returned upwardly and all of the casings in the carton will have their ends twisted closed.

While I have shown a flute 16 as the means for engaging the marginal end 42 of the casing and effecting twisting thereof, most any type of irregular surface on the end of the twisting head 14 is suitable. When flutes are used one is usually sufficient although a multiplicity may be provided if desired.

Some changes may be made in the construction and arrangements of the parts of my casing end closer and my method may be somewhat modified without departing from the real spirit and purpose of my invention. It is therefore my intention to cover by my claims any modified forms of structure or use of mechanical equivalents which may reasonably be included within their scope.

I claim as my invention:

1. In a casing end closer, a non-rotating, sleeve-like casing holder, a rotating twisting member therein, and means on one end of said twisting member to engage the end of a casing and twist the marginal end thereof with said twisting member and relative to the remaining portion of the casing when said remaining portion is held against rotation by said casing closer.

2. A casing end closer in accordance with claim 1 wherein said means comprises an elongated radially extending projection from said end of said rotating twisting member.

3. A casing end closer in accordance with claim 1 wherein said means comprises a flute projecting from said end of said rotating member and extending radially across said end.

4. A casing end closer in accordance with claim 1 having a stripper associated with said rotating twisting member, said stripper having a casing end engaging portion normally spaced beyond said end of said rotating twisting member but capable of movement toward said end by engagement of the casing end therewith, and having means to resiliently resist such movement.

5. A casing end closer according to claim 1 wherein said casing holder has a plurality of projections beyond said end of said rotating member for holding said remaining portion against rotation.

6. A casing end closer in accordance with claim 5 wherein said last means comprises a plurality of prongs having inner edges among which said end of the casing is seated before contacting said rotating twisting member, said inner edges being inclined with their outer ends radially farther apart than the diameter of the casing and their inner ends radially closer together than the diameter of the casing to permit wedging of said remaining portion of the casing thereinto for holding purposes.

7. A casing end closer in accordance with claim 5 wherein said last casing holder and said plurality of projections are movable toward said end of said rotating twisting member, and means is provided to resiliently resist such movement.

8. A casing end closer in accordance with claim 5 having a stripper associated with said rotating twisting member, said stripper having a casing end engaging portion normally spaced beyond said end of said rotating twisting member but capable of movement toward said end by engagement of the casing end therewith, and having means to resiliently resist such movement.

9. A casing end closer in accordance with claim 8 wherein said holding means comprises a plurality of stationary prongs, said end of the casing being seated among said prongs before contacting said rotating twisting member.

References Cited in the file of this patent

UNITED STATES PATENTS

| | | |
|---|---|---|
| 439,820 | Kennedy | Nov. 4, 1890 |
| 990,910 | Sattley | May 2, 1911 |
| 1,417,933 | Maspons | May 30, 1922 |
| 2,111,273 | Becker | Mar. 15, 1938 |
| 2,114,077 | Hensel | Apr. 12, 1938 |
| 2,322,447 | Hensel | June 22, 1943 |
| 2,462,957 | Gunn | Mar. 1, 1949 |

FOREIGN PATENTS

| | | |
|---|---|---|
| 622,409 | France | Feb. 26, 1927 |